April 23, 1940.   C. TEN DOORNKAAT KOOLMAN   2,197,935
PROCESS FOR TREATING GASES AND VAPORS WITH LIQUIDS
Filed Jan. 25, 1937

Inventor,
Carl ten Doornkaat Koolman
by
Potter, Pierce & Scheffler
his Attorneys.

Patented Apr. 23, 1940

2,197,935

UNITED STATES PATENT OFFICE 2,197,935

PROCESS FOR TREATING GASES AND VAPORS WITH LIQUIDS

Carl ten Doornkaat Koolman, Frankfort-on-the-Main, Germany, assignor to American Lurgi Corporation, New York, N. Y., a corporation of New York Application January 25, 1937, Serial No. 122,302
In Germany February 12, 1936

13 Claims. (Cl. 261—97)

This invention relates to a process for treating gases and vapors with liquids.

The known process for treating gases and/or vapors with liquids in reaction towers by admitting the gas into the bottom of the tower, and introducing the liquid from the top so that it flows downwards in a state of fine distribution over the cross section of the tower, in counterflow to the ascending gases or vapors, is attended with various drawbacks. In the first place, said process has the defect that a portion of the liquid does not act on the gases or vapors traversing the tower in the desired finely divided state. This is because even though a tower be employed which is charged in the usual way with fillers for distributing the liquid introduced from above, and the liquid is uniformly distributed over the cross section of the tower at the time of admission, or is extensively distributed in the upper portion of the tower—for example by the upper layers of fillers—the uniform distributing action of the fillers towards all sides, during the passage of the liquid, progressively diverts some of the liquid in the direction of the wall of the tower down which it then trickles as a continuous layer, so that it can no longer act in the desired finely distributed condition, on the gas or vapor.

The reason is that while each particle of liquid which is diverted at any point towards the centre of the tower, continues its downward path therein, or is redistributed on encountering the succeeding lower surface of a filler, each particle of liquid that is diverted towards the wall of the tower by the fillers adjacent to the latter, is, on the contrary, attracted and retained by said wall, and therefore is not redistributed, but unites, with the other progressively increasing particles collecting in a similar manner to form a continuous layer of liquid flowing down the said wall.

Since, on the other hand, the distributing action of the fillers results in continuously diverting fresh quantities of liquid from the central portions of the cross section of the tower towards the outermost fillers, and from these latter on to the wall there is thus a continuous migration of liquid towards the wall of the tower, said liquid being withdrawn to all intents and purposes, from the zone of reaction with the gas or vapor flowing through the tower.

Various attempts have already been made to obviate this defect, for example by specially arranging the fillers, or by fitting intermediate cross partitions intended, in each case, to deflect the liquid from the wall of the tower towards the centre. In practice, however, these arrangements have been found successful only when the ratio of the radius to the height of the active reaction space is about 1:5 or more (for example, 1:6, 1:7, and so on).

A further defect of the known method of irrigating the tower consists in that, owing to the liquid being admitted only at the head of the tower, the composition and temperature of the liquid coming into contact with the gases or vapors at different levels in the tower are necessarily dependent on the preceding reaction with the gases or vapors ascending the tower, and on the existing temperature equilibrium with that of said gases or vapors. In many instances, however, it would be desirable to subject the gases treated with liquid, to the successive action of liquids of different composition and/or at different temperatures.

It has now been ascertained in accordance with the present invention, that substantial advantages, by comparison with the aforesaid method of working, can be obtained by admitting the liquids at different places, such as different levels, into the tower, instead of at only a single point as heretofore.

By operating in accordance with the present invention, it is possible to prevent, for example, the migration of part of the introduced liquid to the wall of the tower by admitting a portion at least of the liquid in a suitable state of distribution, into deeper strata of the fillers, instead of at the topmost stratum of same.

In order more clearly to understand the invention, reference is made to the accompanying drawing, which illustrate diagrammatically and by way of example, two typical embodiments thereof.

Figure 3:
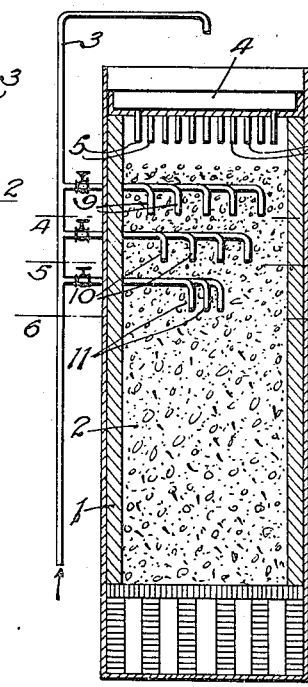
Fig. 3 is a vertical section of a tower provided with liquid distributing pipes extending horizontally into the tower at different levels.
Figure 7:
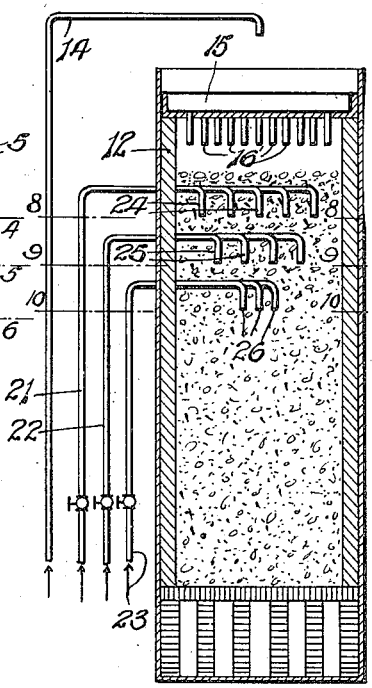
Figure 5:
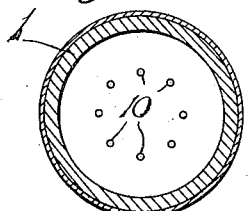
Figure 4:
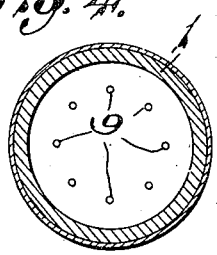
Figure 6:
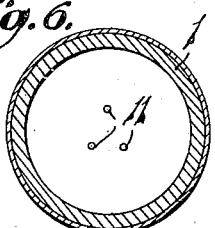

Figs. 4, 5 and 6 are horizontal sections on lines 4—4, 5—5, and 6—6, respectively, of Fig. 3;

Fig. 7 is a vertical section of a tower provided with means for introducing different liquids at different levels and for controlling the distribution of the liquids.

Figure 9:
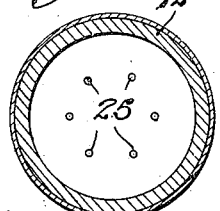
Figure 10:
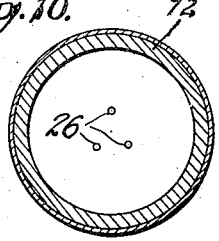
Figure 8:
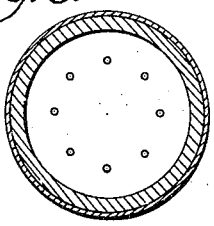

Figs. 8, 9 and 10 are cross-sections on lines 8—8, 9—9, and 10—10, respectively, of Fig. 7.

Figure 1:
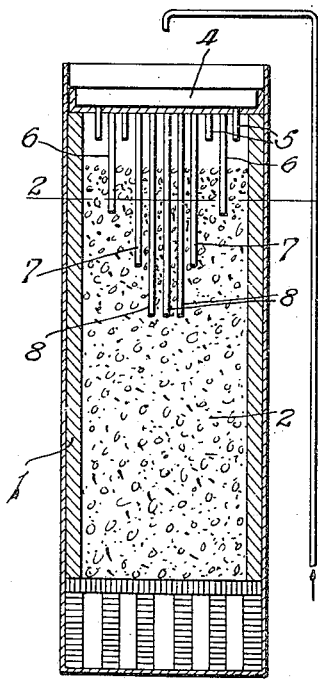
Fig. 1 is a vertical section of a tower provided with pipes of different lengths extending downwardly from the top for introducing the liquid at different levels into the tower filling.
Figure 2:
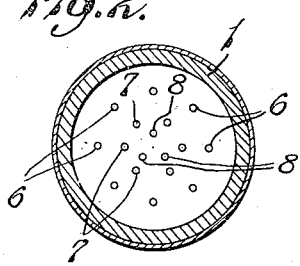
Fig. 2 is a horizontal section on the line 2—2 of Fig. 1.

In Figs. 1 and 2, 1 denotes a reaction tower charged, in the usual way, with fillers 2 of irregular or regular shape, and into which a liquid, maintained in circulation through the pipe 3—by means, for example, of a pump (not shown)—is introduced at the top. From this point the liquid passes, at first, into a collecting chamber 4, from which it is uniformly distributed over the top layer of fillers, through feed orifices 5, in known manner.

In the embodiment shown in Figs. 1 and 2, 6, 7 and 8 denote pipes which are led from the collecting chamber 4 into the interior of the filling of the tower itself. These pipes are so arranged that the central pipes 8, which are the longest and extend about half way down the tower, are concentrically surrounded by a number of shorter pipes 7, and these latter by a number of still shorter pipes 6, which are also concentrically arranged in relation to the central pipes 8. The liquid supplied to these pipes from the collecting chamber 4 is therefore delivered into the interior of the filling at progressively lower levels, but in smaller total amount as the pipes debouch nearer to the centre of the tower. By this means, the progressive diminution of liquid in the central region of the tower as the depth increases is counteracted in the desired manner.

In the embodiment shown in Figs. 3 to 6, a similar equalisation is obtained by admitting portions of the liquid through the pipes 9, 10 and 11—passed laterally into the tower—and the feed orifices of said pipes in the interior of the filling, the number of said orifices provided on each pipe decreasing in number in the downward direction.

Instead of the uniform distribution of the liquid—as provided in both the above embodiments—by means of the feed orifices 5, distributed uniformly over the entire cross section of the tower and supplied from the collecting chamber 4, the distribution of the liquid already to be supplied to the top layer of fillers may be effected by any other convenient devices of known type.

Similarly, instead of distributing the liquid into the deeper parts of the filling, as represented in said embodiments, the method of such distribution can be adapted to the special requirements and working conditions of each separate case.

Thus, for example, in the case of said embodiments, the number, length and method of grouping of the pipes extending into the filling are in nowise restricted to the conditions represented in the drawing.

Thus, for example, the single central pipes 8 and 11 shown in Figs. 1 and 3, may be replaced by two or more pipes. Similarly, the number of the various groups of pipes surrounding the central pipe or pipes, and also the number and length of the pipes in each group, can be varied in accordance with the conditions of each case.

Further advantages can be obtained by the method of introducing the liquid at different levels in the tower, in accordance with the invention, by introducing at these various points, liquid with different physical and/or chemical properties, such as solutions of different substances, or solutions of one and the same substance, but of different concentrations, or also liquids or solutions at different temperatures.

Thus, it may be advisable—for example, in respect of the results of an absorption process—to postpone the treatment of the gas with a comparatively cold liquid to a second stage of the process, in order to avoid excessive quenching, accompanied by the undesirable formation of mist, during the first stage.

It may also be advisable in a second or later stage of the treatment, to subject the gas to the action of liquids other than those employed in the first stage, or preceding phases, and consisting, for example, of solutions of one and the same substance, or substances, but of different concentration, or solutions of different substances, in order to obtain in succession, different effects, or if desired, different chemical reactions between the gas or some of its constituents, and the liquid introduced into the tower at different levels.

According to the present invention, this object can be attained by providing—in addition to the members for supplying a portion of the total liquid at the upper end of the reaction tower, or other reaction chamber—further members for supplying the furthest liquids to the interior of the tower at the various levels under consideration, and to which members, arranged in separate groups, the liquids to be introduced at different levels, are supplied.

In the introduction of different liquids into different levels of the tower, in the described manner, the migration of the liquid towards the wall of the tower can again be counteracted—in the manner described in the foregoing embodiment—by a correspondingly increased supply of liquid to the centre of the tower, by distributing the members provided for introducing the different liquids at the various levels of the tower, in such a manner, inside the tower, that the desired replenishment is effected by the additional supply of liquid to the center of the tower.

Thus, for example, the members provided for introducing one of the different liquids employed to the interior of the tower or column may be arranged in such a way that a central delivery pipe—or two or more such pipes—extending furthest downwards is surrounded by groups of pipes arranged concentrically to one another and to the said central pipe or pipes, the members of said groups being progressively shorter from the centre outwards, and opening into cross-sectional zones at correspondingly different levels in the tower, each group being intended to supply a different or separate liquid.

An embodiment of a reaction tower suitable for the introduction of liquids of different character, in accordance with the present invention, is shown, by way of example, as a vertical longitudinal section in Fig. 7 of the drawing, and as horizontal cross sections, along the lines 8—8, 9—9, and 10—10 respectively of Fig. 7, in Figs. 8, 9 and 10.

In this case the pipes serving to introduce different liquids into and distribute them in the interior of said tower are arranged in such a manner that the liquids are distributed in the different horizontal zones at such points and in such quantities in the interior of the tower as to counteract by a correspondingly increased supply of liquid to the central portion of the tower, the migration of the descending liquid towards the wall of the tower.

In these figures, 12 denotes the reaction tower charged with fillers 13 and supplied with liquid circulated through the pipe 14, collecting chamber 15 and the feed pipes 16, which latter are uniformly distributed over the cross section of the tower.

21, 22 and 23 are pipes for the supply of three other liquids, also of different character, to different levels in the tower, said pipes being led through the side wall of the tower and provided, inside the latter, with outlets 24, 25 and 26 arranged in concentric circles, the number of said outlets 24, 25 and 26 decreasing from above downwards, as can be seen in the cross sections represented in Figs. 8 and 10.

Instead of employing the embodiments shown in the drawing, the process of the present invention can be carried out by means of any other convenient devices which enable two or more liquids of different chemical and/or physical character, to be introduced into the several cross sectional zones on different levels of the tower. If, in this case, the supply of liquid is to be increased to the centre of the tower in proportion as the level on which the zones are situated is lower, this method of supply also counteracts the migration of the liquid originally distributed uniformly at the top of the tower, from the centre of the tower towards the wall of the latter.

The process of the present invention is not restricted to the employment of reaction towers charged with fillers, as shown in the drawing, but it can also be applied to any other convenient reaction chambers in which any gas, or gaseous mixture, ascends from below and meets a counterflow of a liquid descending in a state of fine distribution, which state, may for example, be attained by means of perforated intermediate partitions.

I claim:

1. A reaction tower charged with fillers for the distribution of liquid and provided with means for the uniform distribution of liquid upon the uppermost layer of the fillers, and with groups of pipes of graduated lengths for supplying additional liquid at a plurality of lower levels in the interior of the tower within the mass of fillers, said groups being situated so that the members of the group debouching at each level are surrounded by the members of the group debouching at the next higher level and means for controlling the amount of liquid debouched through at least one of said groups of pipes.

2. A process for treating gases with liquids, which comprises uniformly distributing a liquid over the topmost layer of the fillers in a reaction tower, supplying at least one other liquid of different consistency, to the interior of the tower, at at least one lower level within the mass of fillers and within an area situated away from the wall of the tower, this other liquid being distributed at such points and in such quantities as to counterbalance at least partly the migration of the liquid towards the wall of the tower, and passing gas upwardly through said tower.

3. A process for treating gases with liquids, which comprises uniformly distributing a liquid over the topmost layer of the fillers in a reaction tower, supplying at least one other liquid of different chemical constitution to the interior of the tower at at least one lower level within the mass of fillers and within an area situated away from the wall of the tower, this other liquid being distributed at such points and in such quantities as to counterbalance at least partly the migration of the liquid towards the wall of the tower, and passing gas upwardly through said tower.

4. A process for treating gases with liquids, which comprises uniformly distributing a solution over the topmost layer of the fillers in a reaction tower, supplying at least one other solution of different concentration of the constituent which is to be reacted with the gas, to the interior of the tower, at at least one lower level within the mass of fillers and within an area situated away from the walls of the tower, this other solution being distributed at such points and in such quantities as to counterbalance at least partly the migration of the solution towards the wall of the tower, and passing gas upwardly through said tower.

5. A process for treating gases with liquids, which comprises uniformly distributing a liquid over the topmost layer of the fillers in a reaction tower, supplying at least one other liquid of different temperature to the interior of the tower at at least one lower level within the mass of fillers and within an area situated away from the wall of the tower, this other liquid being distributed at such points and in such quantities as to counterbalance at least partly the migration of the liquid towards the wall of the tower, and passing gas upwardly through said tower.

6. A process for treating gases with liquids, which comprises uniformly distributing a portion only of the total quantity of liquid supplied to the tower over the topmost layer of the fillers in the tower, supplying the remainder of the liquid to the interior of the tower at a plurality of lower levels within the mass of fillers and within areas situated at distances from the wall of the tower, said distances increasing with the depth of the levels, controlling the supply of liquid to said levels so as to counterbalance at least partly the migration of the liquid towards the wall of the tower, and passing the gas upwardly through said tower.

7. A reaction tower charged with fillers for distributing liquids and provided with means for the uniform distribution of liquid upon the uppermost layer of said fillers, and with groups of members for debouching liquid at a plurality of lower graduated levels in the interior of the tower within the mass of fillers and at points situated at distances from the wall of the tower, said distances increasing for each group with the depth of the level thereof and means for controlling the amount of liquid debouched through at least one of said groups of members.

8. A reaction tower charged with fillers for the distribution of liquids and provided with means for the uniform distributiton of liquid upon the uppermost layer of the fillers, and with groups of pipes for supplying liquid, the mouths of the pipes of each group being situated at a lower graduated level in the interior of the tower and at points situated at distances from the wall of the tower, said distances increasing with the depth of the level, the pipes of each group being connected to a common connecting pipe by a pipe passing laterally through the wall of the tower and means for controlling the quantity of liquid supplied to each of said groups of pipes.

9. A process for treating gases with liquids, which comprises uniformly distributing a liquid over the topmost layer of the fillers in a reaction tower with fillers for distributing the liquid, supplying at least one other liquid of different consistency to the interior of the tower at a plurality of lower levels within the mass of fillers and within areas situated at distances from the wall of the tower, said distances increasing with the depth of the tower so as to counterbalance at least partly the migration of the liquid towards the wall of the tower, and passing the gas upwardly through said tower.

10. A process for treating gases with liquids, which comprises uniformly distributing a liquid over the topmost layer of the fillers in a reaction tower, supplying at least one other liquid of different chemical constitution to the interior of the tower at a plurality of lower levels within the mass of fillers and within areas situated at distances from the wall of the tower, said distances increasing with the depth of the tower so as to counterbalance at least partly the migration of the liquid towards the wall of the tower, and passing the gas upwardly through said tower.

11. A process for treating gases with liquids, which comprises uniformly distributing a solution over the topmost layer of the fillers in a reaction tower, supplying at least one other solution of different concentration of the constituent which is to be reacted with the gas to the interior of the tower at a plurality of lower levels within the mass of fillers and within areas situated at distances from the wall of the tower, said distances increasing with the depth of the tower so as to counterbalance at least partly the migration of the liquid towards the wall of the tower, and passing the gas upwardly through said tower.

12. A process for treating gases with liquids, which comprises uniformly distributing a liquid over the topmost layer of the fillers in a reaction tower, supplying at least one other liquid of different temperatures to the interior of the tower at a plurality of lower levels within the mass of fillers and within areas situated at distances from the wall of the tower, said distances increasing with the depth of the tower so as to counterbalance at least partly the migration of the liquid towards the wall of the tower, and passing the gas upwardly through said tower.

13. A process for treating gases with liquids which comprises uniformly distributing a portion only of the total quantity of liquid supplied to a tower over the topmost layer of the fillers in the tower, introducing the remainder of said total quantity of liquid into the interior of the tower at least one lower level within the mass of fillers and within a restricted area spaced from the wall of the tower, controlling the quantity of liquid introduced within said restricted area to counterbalance at least partly the migration of the liquid flowing down the tower toward the wall thereof, and passing a gas upwardly through the tower.

CARL TEN DOORNKAAT KOOLMAN.